(No Model.) 2 Sheets—Sheet 1.

H. J. BRACE.
RUNNING GEAR FOR WAGONS.

No. 502,609. Patented Aug. 1, 1893.

Witnesses
Severance
Calvert Hines

Inventor
Harvey J. Brace.
By J. B. Sawyer,
Attorney (No Model.) 2 Sheets—Sheet 2.
H. J. BRACE.
RUNNING GEAR FOR WAGONS.
No. 502,609. Patented Aug. 1, 1893.
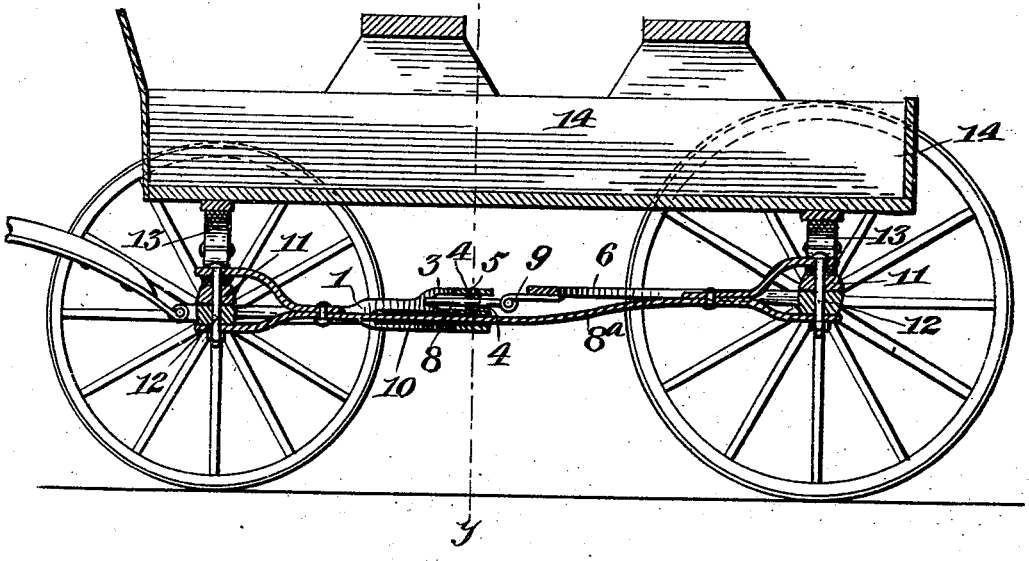
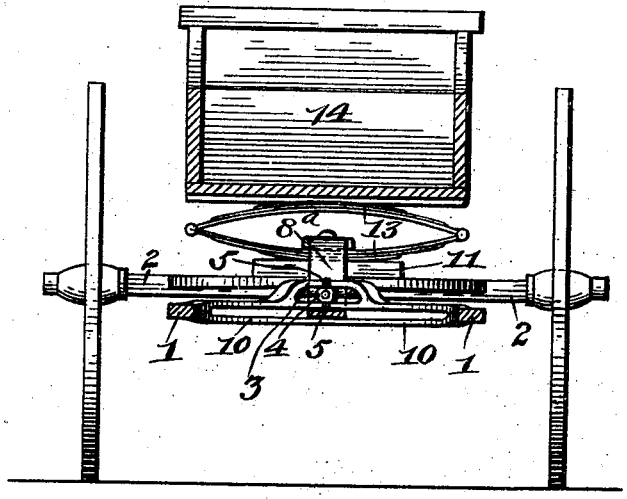
Witnesses
Severance
C. Calvert Hines
Inventor
Harvey J. Brace
By J. B. Sawyer
Attorney

UNITED STATES PATENT OFFICE.

HARVEY J. BRACE, OF ROGERS, ARKANSAS.

RUNNING-GEAR FOR WAGONS.

SPECIFICATION forming part of Letters Patent No. 502,609, dated August 1, 1893.

Application filed October 22, 1892. Serial No. 449,697. (No model.)

*To all whom it may concern:*

Be it known that I, HARVEY J. BRACE, a citizen of the United States, residing at Rogers, in the county of Benton and State of Arkansas, have invented certain new and useful Improvements in Running-Gear for Wagons; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention has for its object to provide a construction in vehicles, whereby they are adapted and enabled to make sharp turns, and for this purpose it consists in pivoting both the front and rear axles and connecting them by a suitable coupling whereby they will be caused to turn in opposite directions, and it also consists in the arrangement, construction, and combination of the several parts of which it is composed, as will be hereinafter more fully described and claimed.

Figure 1:
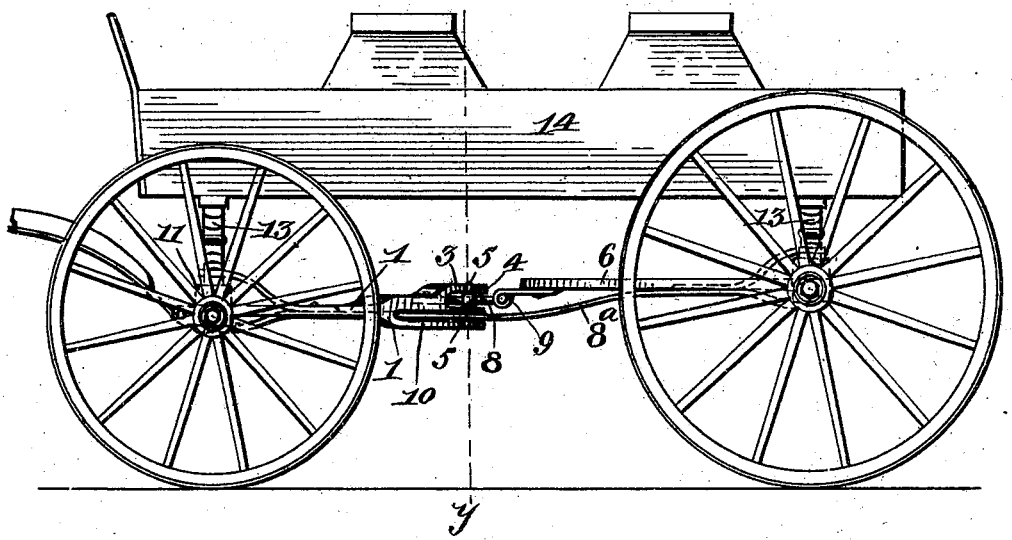
Figure 2:
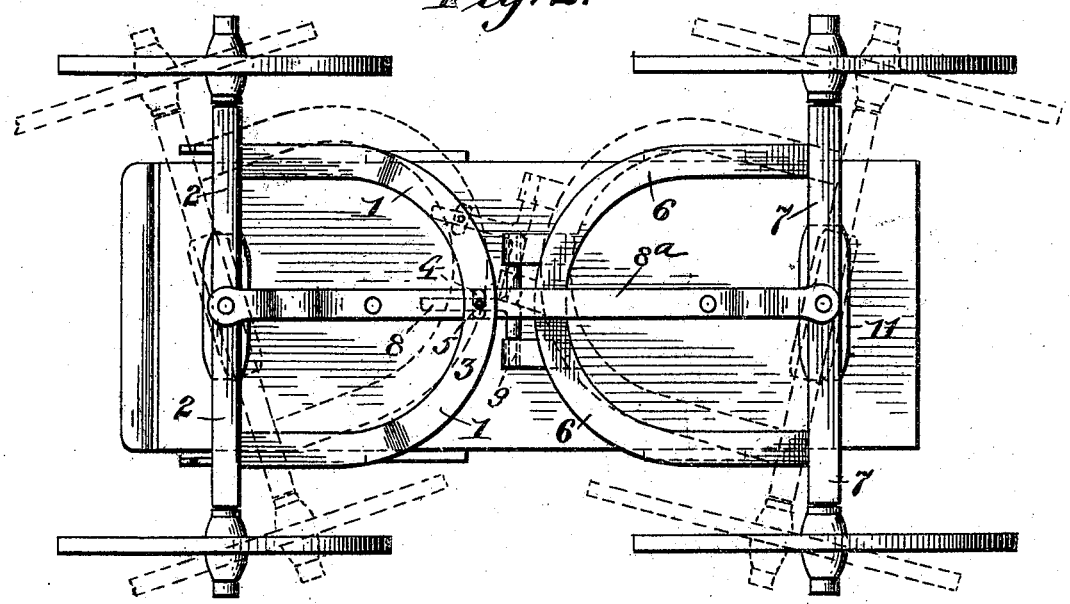

Referring to the accompanying drawings in which corresponding parts are designated by similar marks of reference: Figure 1 is a side view of a wagon having my invention applied thereto. Fig. 2 is an inverted plan view thereof. Fig. 3 is a longitudinal central vertical section. Fig. 4 is a transverse vertical section on line $y$—$y$ of Figs. 1 and 3.

An arc 1 projects rearwardly from the front axle 2, and has its ends secured to the axle near the ends thereof, and has formed upon its upper face at its central portion a bridge 3, between which bridge and the arc, a collar 4, having posts 5 in its opposite sides, is pivoted by the posts which enter the said arc and bridge. An arc 6 projects forwardly from the rear axle 7 and has a pole 8 pivoted thereto by the hinge 9, the said pole passing through the collar 4. It will thus be seen that when it is desired to turn to the right the rear end of the arc 1 is thrown to the left, carrying with it the pole 8, and thus throwing the rear axle 7 in the reverse direction to the front axle, as is shown in dotted lines in Fig. 2, or vice versa. It will also be seen that as the pole can rotate within the collar 4, and can be turned on its hinge 9, a great flexibility of the coupling is obtained, which is thus relieved from all strains in every position of the front and rear axles. A reach $8^a$ has its opposite ends suitably pivoted to the center of the axles, it passing through forks 10 in the arc 1, while if it is desired to use springs in connection with a coupling as above described, a block 11 is pivotally mounted upon the center of each axle and being held by a fork of the reach extending above each of the said blocks and below the axle, and by a king bolt 12 passing therethrough. Between the tops of these blocks and the upper forks of the reach are secured the lower leaves of elliptical springs 13, the upper leaves of which support the wagon body 14, and by this construction it will be seen that the axles are free to move without the blocks carried thereby.

Having thus described my invention, what I claim is—

1. The combination in a wagon, of pivoted front and rear axles, an arc projecting rearwardly from the forward axle, a bridge secured to the said arc, a collar pivoted between the said arc and bridge, an arc secured to the rear axle, a pole hinged to and moving vertically from the last named arc and projecting forwardly therefrom through the said collar, and a reach pivoted to the forward and rear axles and passing through a fork in the forward arc, substantially as described.

2. The combination in a wagon, of pivoted front and rear axles, of an arc projecting rearwardly from the forward axle, a bridge secured to the said arc, a collar pivoted between the said arc and bridge, and a pole having a hinged connection to the rear axle and moving vertically therefrom and passing through the said collar, substantially as described.

In testimony whereof I affix my signature in presence of two witnesses.

HARVEY J. BRACE.

Witnesses:
WILLIAM LAYMANN,
A. R. MCGARRAH.